United States Patent
Hosoya et al.

(10) Patent No.: US 6,797,431 B2
(45) Date of Patent: Sep. 28, 2004

(54) METHOD FOR THE PREPARATION OF CATHODE ACTIVE MATERIAL AND METHOD FOR THE PREPARATION OF NON-AQUEOUS ELECTROLYTE

(75) Inventors: Mamoru Hosoya, Kanagawa (JP); Kimio Takahashi, Miyagi (JP); Yuzuru Fukushima, Miyagi (JP)

(73) Assignee: Sony Corporation, Tokyo (JP)

( * ) Notice: Subject to any disclaimer, the term of this patent is extended or adjusted under 35 U.S.C. 154(b) by 260 days.

(21) Appl. No.: 09/965,273

(22) Filed: Sep. 27, 2001

(65) Prior Publication Data

US 2002/0061274 A1 May 23, 2002

(30) Foreign Application Priority Data

Sep. 29, 2000 (JP) .................................... P2000-301401

(51) Int. Cl.$^7$ .......................... H01M 4/00; C01B 25/00
(52) U.S. Cl. ...................... 429/221; 29/623.1; 423/306
(58) Field of Search .............................. 423/306, 179.5; 429/221; 29/623.1

(56) References Cited

U.S. PATENT DOCUMENTS

| 5,910,382 | A | 6/1999 | Goodenough et al. |
| 6,528,033 | B1 * | 3/2003 | Barker et al. ............... 423/306 |

FOREIGN PATENT DOCUMENTS

| JP | 09134725 | 5/1997 |
| JP | 09171827 | 6/1997 |
| WO | WO 97/40541 | 10/1997 |
| WO | WO 98/12761 | 3/1998 |
| WO | WO 01/53198 | 7/2001 |

OTHER PUBLICATIONS

Pending U.S. patent application—USSN 09/956,514—Method for the Preparation of Cathode Active Material and Method for the Preparation of Non–Aqueous Electrolyte; Inventor(s)—Hosoya, M. et al., Filed Sep. 19, 2001.
Pending U.S. patent application—USSN 09/961,863—Method for the Preparation of Cathode Active Material and Method for the Preparation of Non–Aqueous Electrolyte; Inventor(s)—Hosoya, M. et al., Filed Sep. 24, 2001.

* cited by examiner

*Primary Examiner*—Steven Bos
(74) *Attorney, Agent, or Firm*—Sonnenschein, Nath & Rosenthal LLP

(57) ABSTRACT

A $LiFePO_4$ carbon composite material is to be synthesized in a single phase satisfactorily to achieve superior cell characteristics. In preparing a cathode active material, starting materials for synthesis of a compound represented by the general formula $Li_xFePO_4$, where $0<x\leq1$, are mixed, milled and a carbon material is added to the resulting mass at an optional time point in the course of mixing, milling and sintering. $Li_3PO_4$, $Fe_3(PO_4)_2$ or its hydrates $Fe_3(PO_4)_2 \cdot nH_2O$, where n denotes the number of hydrates, are used as the starting materials for synthesis of $Li_xFePO_4$. The the temperature of a product from said sintering is set to 305° C. or less when said product from said sintering is exposed to atmosphere. The oxygen concentration in a sintering atmosphere is set to 1012 ppm in volume or less at the time point of sintering.

6 Claims, 2 Drawing Sheets

METHOD FOR THE PREPARATION OF CATHODE ACTIVE MATERIAL AND METHOD FOR THE PREPARATION OF NON-AQUEOUS ELECTROLYTE

BACKGROUND OF THE INVENTION

1. Field of the Invention

This invention relates to a method for the preparation of a cathode active material, capable of reversibly doping/undoping lithium, and to a method for the preparation of a non-aqueous electrolyte cell employing ths cathode active material.

2. Description of Related Art

Nowadays, in keeping up with the recent marked progress in the electronic equipment, researches into re-chargeable secondary cells, as power sources usable conveniently and economically for prolonged time, are underway. Representative of the secondary cells are lead accumulators, alkali accumulators and non-aqueous electrolyte secondary cells.

Of the above secondary cells, lithium ion secondary cells, as non-aqueous electrolyte secondary cells, have such merits as high output and high energy density. The lithium ion secondary cells are made up of a cathode and an anode, including active materials capable of reversibly doping/undoping lithium ions, and a non-aqueous electrolyte.

As the anode active material, metal lithium, lithium alloys, such as Li—Al alloys, electrically conductive high molecular materials, such as polyacetylene or polypyrrole, doped with lithium, inter-layer compounds, having lithium ions captured into crystal lattices, or carbon materials, are routinely used. As the electrolytic solutions, the solutions obtained on dissolving lithium salts in non-protonic organic solvents, are used.

As the cathode active materials, metal oxides or sulfides, or polymers, such as $TiS_2$, $MoS_2$, $NbSe_2$ or $V_2O_5$, are used. The discharging reaction of the non-aqueous electrolyte secondary cells, employing these materials, proceeds as lithium ions are eluated into the electrolytic solution in the anode, whilst lithium ions are intercalated into the space between the layers of the cathode active material. In charging, a reaction which is the reverse of the above-described reaction proceeds, such that lithium is intercalated in the cathode. That is, the process of charging/discharging occurs repeatedly by the repetition of the reaction in which lithium ions from the anode make an entrance into and exit from the cathode active material.

As the cathode active materials for the lithium ion secondary cells, $LiCoO_2$, $LiNiO_2$ and $LiMn_2O_4$, for example, having a high energy density and a high voltage, are currently used. However, these cathode active materials containing metallic elements having low Clarke number in the composition thereof, are expensive, while suffering from supply difficulties. Moreover, these cathode active materials are relatively high in toxicity and detrimental to environment. For this reason, novel cathode active materials, usable in place of these materials, are searched.

On the other hand, it is proposed to use $LiFePO_4$, having an olivinic structure, as a cathode active material for the lithium ion secondary cells. $LiFePO_4$ has a high volumetric density of 3.6 g/cm$^3$ and is able to develop a high potential of 3.4 V, with the theoretical capacity being as high as 170 mAh/g. In addition, $LiFePO_4$ in an initial state has an electro-chemically undopable Li at a rate of one Li atom per each Fe atom, and hence is a promising material as a cathode active material for the lithium ion secondary cell. Moreover, since $LiFePO_4$ includes iron, as an inexpensive material rich in supply as natural resources, it is lower in cost than $LiCoO_2$, $LiNiO_2$ or $LiMn_2O_4$, mentioned above, while being more amenable to environment because of lower toxicity.

However, $LiFePO_4$ is low in electronic conduction rate, such that, if this material is used as a cathode active material, the internal resistance in the cell tends to be increased. The result is that the polarization potential on cell circuit closure is increased due to increased internal resistance of the cell to decrease the cell capacity. Moreover, since the true density of $LiFePO_4$ is lower than that of the conventional cathode material, the charging ratio of the active material cannot be increased sufficiently if $LiFePO_4$ is used as the cathode active material, such that the energy density of the cell cannot be increased sufficiently.

So, a proposal has been made to use a composite material of a carbon material and a compound of an olivinic structure having the general formula of $Li_xFePO_4$ where $0<x\leq1$, referred to below as $LiFePO_4$ carbon composite material, as a cathode active material.

Meanwhile, as a method for the preparation of the $LiFePO_4$ carbon composite material, having the olivinic structure, such a method has been proposed which consists in mixing lithium phosphate ($Li_3PO_4$) and iron phosphate I ($Fe_3(PO_4)_2$ or hydrates thereof (($Fe_3(PO_4)_2 \cdot nH_2O$), where n denotes the number of hydrates, adding carbon to the resulting mixture and in sintering the resulting mass at a pre-set temperature, such as 600° C. or thereabouts.

However, Fe in $LiFePO_4$ is in the bivalent state and is liable to oxidation, so that, at a synthesizing temperature of 600° C. or thereabout, the following reaction of the chemical formula (1):

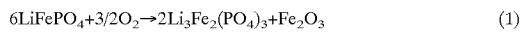

$$6LiFePO_4 + 3/2O_2 \rightarrow 2Li_3Fe_2(PO_4)_3 + Fe_2O_3 \qquad (1)$$

occurs in air. As may be seen from this chemical formula, if the above compound is fired in an ordinary atmosphere, that is in air, impurities, such as trivalent Fe compounds, are produced, such that the $LiFePO_4$ carbon composite material cannot be synthesized in a single phase.

SUMMARY OF THE INVENTION

It is therefore an object of the present invention to provide a method for the preparation of a cathode active material according to which the $LiFePO_4$ carbon composite material can be synthesized in a single phase satisfactorily to realize satisfactory cell characteristics.

It is another object of the present invention to provide a method for the preparation of a non-aqueous electrolyte cell which, through use of the so-produced $LiFePO_4$ carbon composite material, as the cathode active material, is superior in cell characteristics, such as cell capacity or cyclic characteristics.

In one aspect, the present invention provides a method for the preparation of a cathode active material including mixing, milling and sintering materials for synthesis of a compound represented by the general formula $Li_xFePO_4$, where $0<x\leq1$, and adding a carbon material to the resulting mass at an optional time point in the course of the mixing, milling and sintering, employing $Li_3PO_4$, $Fe_3(PO_4)_2$ or hydrates $Fe_3(PO_4)_2 \cdot nH_2O$ thereof, where n denotes the number of hydrates, as the materials for synthesis of the $Li_xFePO_4$, and setting the oxygen concentration in a sintering atmosphere to 1012 ppm in volume or less at the time point of sintering.

Since the oxygen concentration in the sintering atmosphere is defined as described above, oxidation of Fe during sintering can be prevented from occurring and hence the single-phase synthesis of the $LiFePO_4$ carbon composite material can be achieved satisfactorily even if the sintering is performed at a temperature e.g., of 600° C. Meanwhile, the milling herein denotes executing the comminuting and mixing simultaneously.

In another aspect, the present invention provides a method for the preparation of a non-aqueous electrolyte cell including a cathode having a cathode active material, an anode having an anode active material and a non-aqueous electrolyte, wherein, in preparing the cathode active material, sintering starting materials for synthesis of a compound represented by the general formula $Li_xFePO_4$, where $0<x\leq 1$, are mixed and milled, and wherein a carbon material is added to the resulting mass at an optional time point in the course of the mixing, milling and sintering. $Li_3PO_4$, $Fe_3(PO_4)_2$ or hydrates $Fe_3(PO_4)_2 \cdot nH_2O$ thereof, where n denotes the number of hydrates, is used as the starting materials for synthesis of the $Li_xFePO_4$. The oxygen concentration in a sintering atmosphere is set to 1012 ppm in volume or less at the time point of sintering.

Since the oxygen concentration in the sintering atmosphere is defined as described above, oxidation of Fe during sintering can be prevented from occurring and hence the single-phase synthesis of the $LiFePO_4$ carbon composite material can be achieved satisfactorily even if the sintering is performed at a temperature e.g., of 600° C. So, with the use of this composite material as the cathode active material, a non-aqueous electrolyte cell which is superior in cell characteristics may be produced.

DESCRIPTION OF THE PREFERRED EMBODIMENTS

Figure 1:
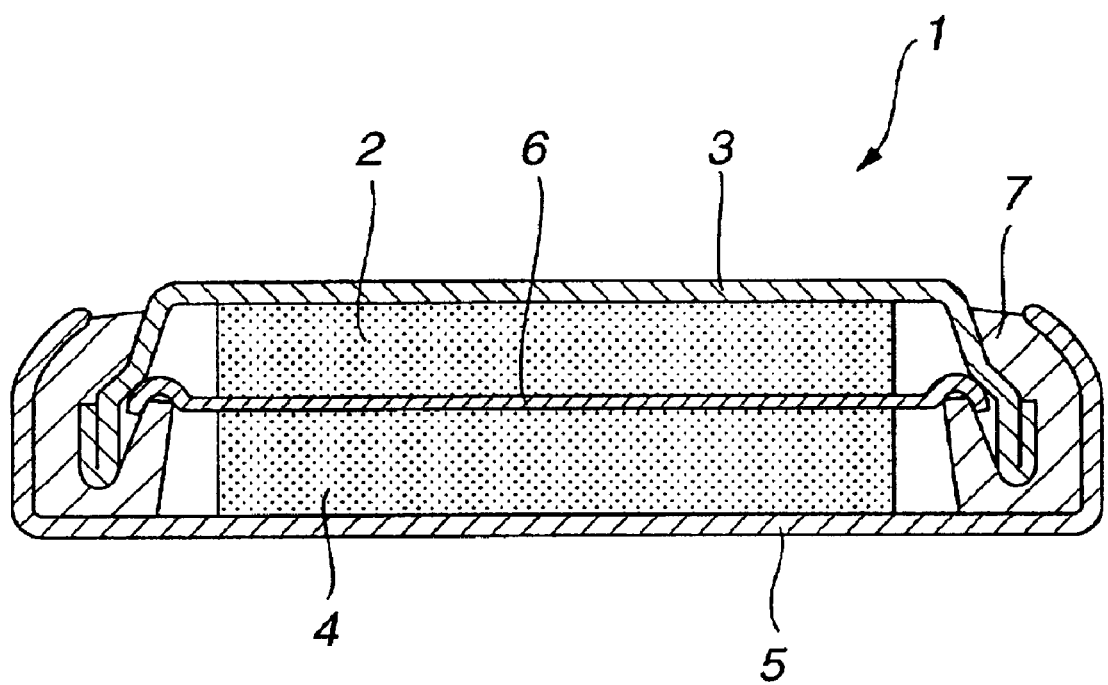
FIG. 1 is a longitudinal cross-sectional view showing an illustrative structure of a non-aqueous electrolyte cell embodying the present invention.

Referring to the drawings, preferred embodiments of the present invention will be explained in detail.

Referring to FIG. 1, a non-aqueous electrolyte cell 1, prepared in accordance with the present invention, includes an anode 2, an anode can 3, holding the anode 2, a cathode 4, a cathode can 5 holding the cathode 4, a separator 6 interposed between the cathode 4 and the anode 2, and an insulating gasket 7. In the anode can 3 and in the cathode can 5 is charged a non-aqueous electrolytic solution.

The anode 2 is formed by e.g., a foil of metal lithium as an anode active material. If a material capable of doping/undoping lithium is used as the anode active material, the anode 2 is a layer of an anode active material formed on an anode current collector, which may, for example, be a nickel foil.

As the anode active material, capable of doping/undoping lithium, metal lithium, lithium alloys, lithium-doped electrically conductive high molecular materials or layered compounds, such as carbon materials or metal oxides.

The binder contained in the anode active material may be any suitable known resin material, routinely used as the binder of the layer of the anode active material for this sort of the non-aqueous electrolyte cell.

The anode can 3 holds the anode 2, while operating as an external anode of the non-aqueous electrolyte cell 1.

The cathode 4 is a layer of the cathode active material formed on a cathode current collector, such as an aluminum foil. The cathode active material, contained in the cathode 4, is able to reversibly emit or occlude lithium electrochemically.

As the cathode active material, a composite material of carbon and a compound of an olivinic structure represented by the general formula $Li_xFePO_4$, where $0<x<\leq 1.0$, that is the $LiFePO_4$ carbon composite material, the detailed manufacturing method for which will be explained subsequently, is used.

In the following explanation, it is assumed that $LiFePO_4$ is used as $Li_xFePO_4$ and a composite material composed of this compound and carbon is used as the cathode active material.

The $LiFePO_4$ carbon composite material is such a material composed of $LiFePO_4$ particles on the surfaces of which are attached numerous particles of the carbon material having the particle size appreciably smaller than the particle size of the $LiFePO_4$ particles. Since the carbon material is electrically conductive, the $LiFePO_4$ carbon composite material, composed of the carbon material and $LiFePO_4$, is higher in electronic conductivity than e.g., $LiFePO_4$. That is, since the $LiFePO_4$ carbon composite material is improved in electronic conductivity due to the carbon particles attached to the $LiFePO_4$ particles, the capacity proper to $LiFePO_4$ can be sufficiently manifested. Thus, by using the $LiFePO_4$ carbon composite material as the cathode active material, the non-aqueous electrolyte secondary cell 1 having a high capacity can be achieved.

The carbon content per unit weight in the $LiFePO_4$ carbon composite material is desirably not less than 3 wt %. If the carbon content per unit weight of the $LiFePO_4$ carbon composite material is less than 3 wt %, the amount of carbon particles attached to $LiFePO_4$ may be insufficient so that sufficient favorable effect in improving the electronic conductivity may not be realized.

As the carbon material forming the $LiFePO_4$ carbon composite material, such a material is preferably used which has an intensity area ratio of diffracted beams appearing at the number of waves of 1570 to 1590 $cm^{-1}$ to the diffracted beams appearing at the number of waves of 1340 to 1360 $cm^{-1}$ in the Raman spectrum of graphite in the Raman spectroscopy, or the ratio A(D/G), equal to 0.3 or higher.

Figure 2:
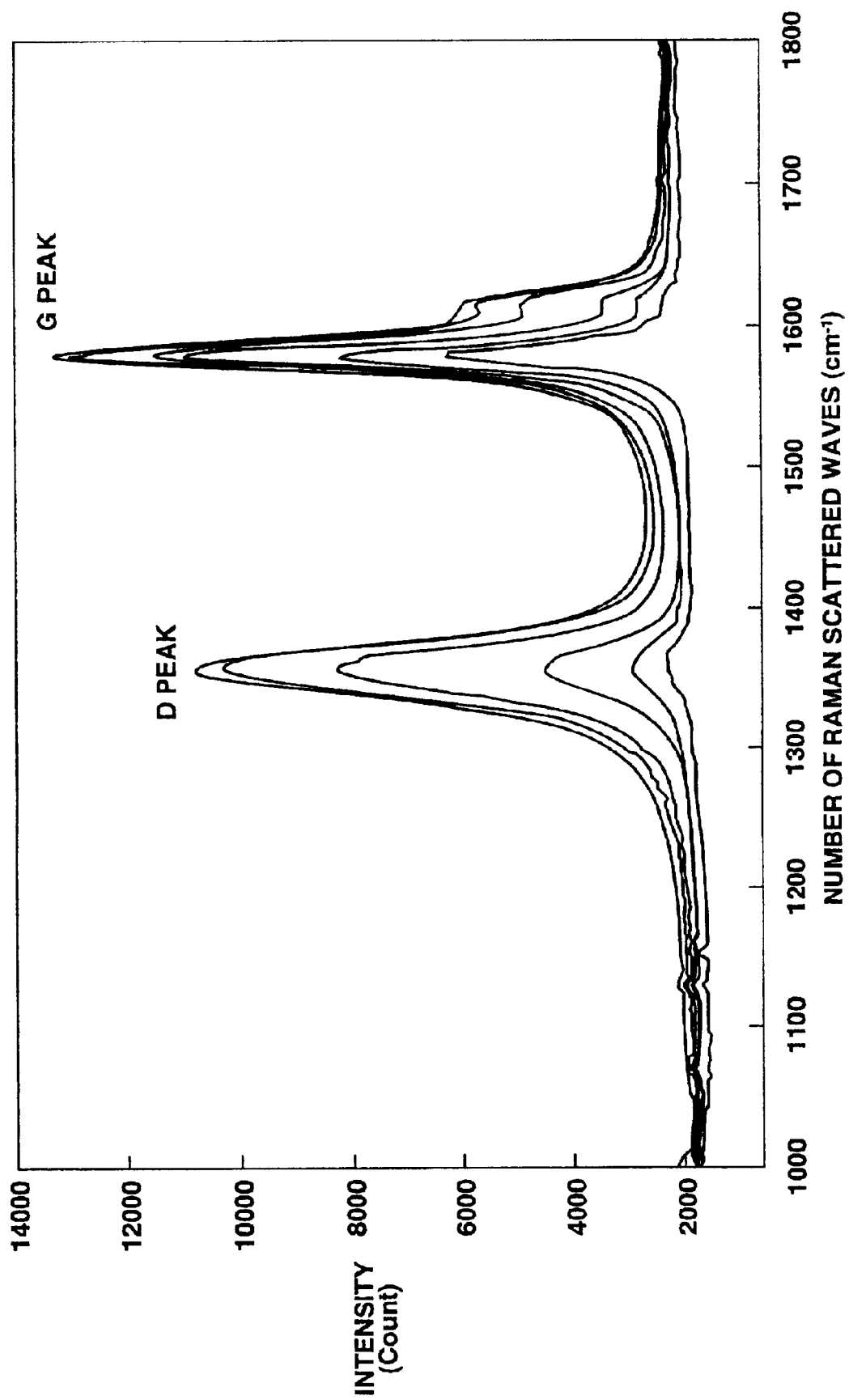
FIG. 2 is a graph showing Raman spectral peaks of a carbon material.

The intensity area ratio A(D/G) is defined as being a background-free Raman spectral intensity area ratio A(D/G) of a G-peak appearing at the number of waves of 1570 to 1590 $cm^{-1}$ and a D-peak appearing at the number of waves of 1340 to 1360 $cm^{-1}$ as measured by the Raman spectroscopic method as shown in FIG. 2. The expression "background-free" denotes the state free from noisy portions.

Among the numerous peaks of the Raman spectrum of Gr, two peaks, namely a peak termed a G-peak appearing at the number of waves of 1570 to 1590 $cm^{-1}$ and a peak termed a D-peak appearing at the number of waves of 1340 to 1360 $cm^{-1}$, as discussed above, may be observed. Of these, the D-peak is not a peak inherent in the G-peak, but is a Raman inactive peak appearing when the structure is distorted and lowered in symmetry. So, the D-peak is a measure of a distorted structure of Gr. It is known that the intensity area ratio A (D/G) of the D- and G-peaks is proportionate to a reciprocal of the crystallite size La along the axis a of Gr.

As such carbon material, an amorphous carbon material, such as acetylene black, is preferably employed.

The carbon material having the intensity area ratio A (D/G) not less than 0.3 may be obtained by processing such as comminuting with a pulverizing device. A carbon material having an arbitrary ratio A (D/G) may be realized by controlling the pulverizing time duration.

For example, graphite, as a crystalline carbon material, may readily be destroyed in its structure by a powerful pulverizing device, such as a planetary ball mill, and thereby progressively amorphized, so that the intensity area ratio A (D/G) is concomitantly increased. That is, by controlling the driving time duration of a pulverizing device, such a carbon material having a desired A (D/G) value not less than 0.3 may readily be produced. Thus, subject to pulverization, a crystalline carbon material may also be preferably employed as a carbon material.

The powder density of the LiFePO$_4$ carbon composite material is preferably not less than 2.2 gg/cm$^3$. If the material for synthesis of the LiFePO$_4$ carbon composite material is milled to such an extent that the powder density is not less than 2.2 g/cm$^3$, the resulting LiFePO$_4$ carbon composite material is comminuted sufficiently to realize a non-aqueous electrolyte secondary cell 1 having a higher charging ratio of the cathode active material and a high capacity. Moreover, since the LiFePO$_4$ carbon composite material is comminuted to satisfy the aforementioned powder density, its specific surface may be said to be increased. That is, a sufficient contact area may be maintained between LiFePO$_4$ and the carbon material to improve the electronic conductivity.

If the powder density of the LiFePO$_4$ carbon composite material is less than 2.2 g/cm$^3$, the LiFePO$_4$ carbon composite material is not compressed sufficiently, so that there is a risk that the packing ratio of the active material cannot be improved at the cathode 4.

On the other hand, the Bulnauer Emmet Teller (BET) specific surface area in the LiFePO$_4$ carbon composite material is preferably not less than 10.3 m$^2$/g. If the BET specific surface area of the LiFePO$_4$ carbon composite material is not less than 10.3 m$^2$/g, the surface area of LiFePO$_4$ per unit weight can be sufficiently increased to increase the contact area between LiFePO$_4$ and the carbon material to improve the electronic conductivity of the cathode active material.

The primary particle size of the LiFePO$_4$ carbon composite material is preferably not larger than 3.1 $\mu$m. By the primary particle size of the LiFePO$_4$ carbon composite material being not larger than 3.1 $\mu$m, the surface area of LiFePO$_4$ per unit area may be sufficiently increased to increase the contact area between LiFePO$_4$ and the carbon material to improve the electronic conductivity of the cathode active material.

The binder contained in the layer of the cathode active material may be formed of any suitable known resin material routinely used as the binder for the layer of the cathode active material for this sort of the non-aqueous electrolyte cell.

The cathode can 5 holds the cathode 4 while operating as an external cathode of the non-aqueous electrolyte cell 1.

The separator 6, used for separating the cathode 4 and the anode 2 from each other, may be formed of any suitable known resin material routinely used as a separator for this sort of the non-aqueous electrolyte cell. For example, a film of a high molecular material, such as polypropylene, is used. From the relation between the lithium ion conductivity and the energy density, the separator thickness which is as thin as possible is desirable. Specifically, the separator thickness desirably is 50 $\mu$m or less.

The insulating gasket 7 is built in and unified to the anode can 3. The role of this insulating gasket 7 is to prevent leakage of the non-aqueous electrolyte solution charged into the anode can 3 and into the cathode can 5.

As the non-aqueous electrolyte solution, such a solution obtained on dissolving an electrolyte in a non-protonic aqueous solvent is used.

As the non-aqueous solvent, propylene carbonate, ethylene carbonate, butylene carbonate, vinylene carbonate, $\gamma$-butyrolactone, sulforane, 1,2-dimethoxyethane, 1, 2-diethoxyethane, 2-methyl tetrahydrofuran, 3-methyl-1,3-dioxolane, methyl propionate, methyl lactate, dimethyl carbonate, diethyl carbonate and dipropyl carbonate, for example, may be used. In view of voltage stability, cyclic carbonates, such as propylene carbonate, ethylene carbonate, butylene carbonate or vinylene carbonate, and chained carbonates, such as dimethyl carbonate, diethyl carbonate and dipropyl carbonate, are preferably used. These non-aqueous solvents may be used alone or in combination.

As the electrolytes dissolved in the non-aqueous solvent, lithium salts, such as LiPF$_6$, LiClO$_4$, LiAsF$_6$, LiBF$_4$, LiCF$_3$SO$_3$ or LiN(CF$_3$SO$_2$)$_2$, may be used. Of these lithium salts, LiPF$_6$ and LiBF$_4$ are preferred.

Although the non-aqueous electrolyte cell, explained above, is the non-aqueous electrolyte secondary cell 1 employing a non-aqueous electrolyte solution, the present invention is not limited thereto, but may be applied to such a cell employing a solid electrolyte as the non-aqueous electrolyte. The solid electrolyte used may be an inorganic solid electrolyte or a high molecular solid electrolyte, such as gel electrolyte, provided that the material used exhibits lithium ion conductivity. The inorganic solid electrolyte may be enumerated by lithium nitride and lithium iodide. The high molecular solid electrolyte is comprised of an electrolyte salt and a high molecular compound dissolving it. The high molecular compound may be an etheric high molecular material, such as poly(ethylene oxide), cross-linked or not, a poly(methacrylate) ester based compound, or an acrylate-based high molecular material, either alone or in combination in the state of being copolymerized or mixed in the molecules. In this case, the matrix of the gel electrolyte may be a variety of high molecular materials capable of absorbing and gelating the non-aqueous electrolyte solution. As these high molecular materials, fluorine-based high molecular materials, such as, for example, poly(vinylidene fluoride) or poly(vinylidene fluoride —CO—hexafluoropropylene), etheric high molecular materials, such as polyethylene oxide, cross-linked or not, or poly(acrylonitrile), may be used. Of these, the fluorine-based high molecular materials are particularly desirable in view of redox stability.

The method for the preparation of the non-aqueous electrolyte cell 1, constructed as described above, is hereinafter explained.

First, a composite material of Li$_x$FePO$_4$ and the carbon material, as a cathode active material, is synthesized by a manufacturing method as now explained.

For synthesizing the cathode active material, Li$_x$FePO$_4$ as a starting material for synthesis is kneaded together, milled and sintered. At an optional time point in the course of the mixing, milling and sintering, a carbon material is added to the kneaded starting materials for synthesis. As the Li$_x$FePO$_4$ starting materials for synthesis, Li$_3$PO$_4$, Li$_3$(PO$_4$)$_2$ or a hydrate Fe$_3$(PO$_4$)$_2$·nH$_2$O thereof where n denotes the number of hydrates, are used.

In the following, such a case is explained in which lithium phosphate Li$_3$PO$_4$ and a hydrate Fe$_3$(PO$_4$)$_2$·8H$_2$O thereof, synthesized as explained below, are used as starting materials for synthesis, and in which, after adding a carbon material to these starting materials for synthesis, a number of process steps are executed to synthesize the LiFePO$_4$ carbon composite material.

First, the LiFePO$_4$ starting materials for synthesis and the carbon material are mixed together to form a mixture by way of a mixing step. The mixture from the mixing step is then milled by a milling process, and the milled mixture then is fired by way of a sintering process.

In the mixing process, lithium phosphate and iron phosphate I octahydrate are mixed together at a pre-set ratio and further added to with a carbon material to form a mixture.

This iron phosphate I octahydrate, used as a starting material for synthesis, is synthesized by adding disodium hydrogen phosphate duodecahydrate (2Na$_2$HPO$_4$·12H$_2$O) to an aqueous solution obtained on dissolving iron phosphate heptahydrate (FeSO$_4$·7H$_2$O) in water and by allowing the resulting mass to dwell for a pre-set time. The reaction of synthesis of iron phosphate I octahydrate may be represented by the following chemical formula (2):

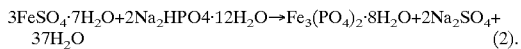

In iron phosphate I octahydrate, as the material for synthesis, there is contained a certain amount of Fe$^{3+}$ from the synthesis process. If Fe$^{3+}$ is left in the material for synthesis, a trivalent Fe compound is generated by sintering to obstruct single-phase synthesis of the LiFePO$_4$ carbon composite material. It is therefore necessary to add a reducing agent to the starting materials for synthesis prior to sintering and to reduce Fe$^{3+}$ contained in the starting materials for synthesis at the time of firing to Fe$^{2+}$.

However, there is a limitation to the capability of the reducing agent in reducing Fe$^{3+}$ to Fe$^{2+}$ by the reducing agent, such that, if the content of Fe$^{3+}$ in the starting materials for synthesis is excessive, it may be an occurrence that Fe$^{3+}$ is not reduced in its entirety but is left in the LiFePO$_4$ carbon composite material.

It is therefore desirable that the content of Fe$^{3+}$ in the total iron in the iron phosphate I octahydrate be set to 61 wt % or less. By limiting the content of Fe$^{3+}$ in the total iron in the iron phosphate I octahydrate to 61 wt % or less from the outset, single-phase synthesis of the LiFePO$_4$ carbon composite material can be satisfactorily achieved without allowing Fe$^{3+}$ to be left at the time of firing, that is without generating impurities ascribable to Fe$^{3+}$.

It should be noted that, the longer the dwell time in generating iron phosphate I octahydrate, the larger becomes the content of Fe$^{3+}$ in the generated product, so that, by controlling the dwell time so as to be equal to a preset time, iron phosphate I octahydrate having an optional Fe$^{3+}$ can be produced. The content of Fe$^{3+}$ in the total iron in the iron phosphate I octahydrate can be measured by the Mesbauer method.

The carbon material added to the starting materials for synthesis acts as a reducing agent for reducing Fe$^{3+}$ to Fe$^{2+}$, at the time of sintering, even if Fe$^{2+}$ contained in iron phosphate I octahydrate as the starting materials for synthesis is oxidized to Fe$^{3+}$ by oxygen in atmosphere or due to sintering. Therefore, even if Fe$^{3+}$ is left in the starting materials for synthesis, impurities may be prevented from being generated to assure single-phase synthesis of the LiFePO$_4$ carbon composite material. Moreover, the carbon material acts as an antioxidant for preventing oxidation of Fe$^{2+}$ contained in the starting materials for synthesis to Fe$^{3+}$. That is, the carbon material prevents oxidation to Fe$^{3+}$ of Fe$^{2+}$ by oxygen present in atmosphere and in a firing oven prior to or during sintering.

That is, the carbon material acts not only as an electrification agent for improving the electronic conductivity of the cathode active material but also as a reducing agent and as an antioxidant. Meanwhile, since this carbon material is a component of the LiFePO$_4$ carbon composite material, there is no necessity of removing the carbon material following synthesis of the LiFePO$_4$ carbon composite material. The result is the improved efficiency in the preparation of the LiFePO$_4$ carbon composite material.

It is noted that the carbon content per unit weight of the LiFePO$_4$ carbon composite material be not less than 3 wt %. By setting the carbon content per unit weight of the LiFePO$_4$ carbon composite material to not less than 3 wt %, it is possible to utilize the capacity and cyclic characteristics inherent in LiFePO$_4$ to its fullest extent.

In the milling process, the mixture resulting from the mixing process is subjected to milling in which pulverization and mixing occur simultaneously. By the milling herein is meant the powerful comminuting and mixing by a ball mill. As the ball mill, a planetary ball mill, a shaker ball mill or a mechano-fusion may selectively be employed.

By milling the mixture from the mixing process, the starting materials for synthesis and the carbon material can be mixed homogeneously. Moreover, if the starting materials for synthesis is comminuted by milling, the specific surface area of the starting materials for synthesis can be increased, thereby increasing the contact points of the starting materials for synthesis to accelerate the synthesis reaction in the subsequent sintering process.

It is desirable that, by milling the mixture containing the starting materials for synthesis, the particle size distribution of the particle size not less than 3 μm be not larger than 22% in terms of the volumetric integration frequency. With the particle size distribution of the starting materials for synthesis in the above range, the starting materials for synthesis has a surface area sufficient to produce surface activity for carrying out the synthesis reaction. Thus, even if the sintering temperature is of a low value of e.g., 600° C. which is lower than the melting point of the starting materials for synthesis, the reaction efficiency is optimum, thus realizing the single-phase synthesis of the LiFePO$_4$ carbon composite material satisfactorily.

Moreover, the milling is desirably executed so that the powder density of the LiFePO$_4$ carbon composite material will be 2.2 g/cm$^3$ or higher. By comminuting the starting materials for synthesis to give the above defined powder density, the specific surface area of LiFePO$_4$ and hence the contact area between LiFePO$_4$ and the carbon material can be increased to improve the electronic conductivity of the cathode active material.

In the firing process, the milled mixture from the milling process is sintered. By sintering the mixture, lithium phosphate can be reacted with iron phosphate I octahydrate to synthesize LiFePO$_4$.

The synthesis reaction of LiFePO$_4$ may be represented by the following reaction formula (3):

where n denotes the number of hydrates and is equal to 0 for an anhydride. In the chemical formula (3), Li$_3$PO$_4$ is reacted with Fe$_3$(PO$_4$)$_2$ or its hydrate Fe$_3$(PO$_4$)$_2$·nH$_2$O where n denotes the number of hydrates.

As may be seen from the chemical formula (3), no by-product is yielded if Fe$_3$(PO$_4$)$_2$ is used as a starting materials for synthesis. On the other hand, if Fe$_3$(PO$_4$)$_2$·nH$_2$O is used, water, which is non-toxic, is by-produced.

Heretofore, lithium carbonate, ammonium dihydrogen phosphate and iron acetate II, as syntheses materials, are mixed at a pre-set ratio and sintered to synthesize LiFePO$_4$ by the reaction shown by the chemical formula (4):

As may be seen from the reaction formula (4), toxic by-products, such as ammonia or acetic acid, are generated on sintering with the conventional synthesis method for LiFePO$_4$. So, a large-scale equipment, such as gas collector, is required for processing these toxic by-products, thus raising the cost. In addition, the yield of LiFePO$_4$ is lowered because these by-products are generated in large quantities.

According to the present invention, in which Li$_3$PO$_4$, Fe$_3$(PO$_4$)$_2$ or its hydrate Fe$_3$(PO$_4$)$_2$·nH$_2$O, where n denotes the number of hydrates, is used as the starting material for synthesis, targeted LiFePO$_4$ can be produced without generating toxic by-products. In other words, safety in sintering may be appreciably improved as compared to the conventional manufacturing method. Moreover, while a large-scale processing equipment is heretofore required for processing toxic by-products, the manufacturing method of the present invention yields only water, which is innoxious, as a by-product, thus appreciably simplifying the processing step to allow to reduce size of the processing equipment. The result is that the production cost can be appreciably lower than if ammonia etc which is by-produced in the conventional system has to be processed. Moreover, since the by-product is yielded only in minor quantities, the yield of $LiFePO_4$ may be improved significantly.

Although the sintering temperature in sintering the mixture may be 400 to 900° C. by the above synthesis method, it is preferably 600° C. or thereabouts in consideration of the cell performance. If the sintering temperature is less than 400° C., neither the chemical reaction not crystallization proceeds sufficiently such that there is the risk that the phase of impurities such as $Li_3PO_4$ of the starting materials for synthesis may persist and hence the homogeneous $LiFePO_4$ cannot be produced. If conversely the sintering temperature exceeds 900° C., crystallization proceeds excessively so that the $LiFePO_4$ particles are coarse in size to decrease the contact area between $LiFePO_4$ and the carbon material to render it impossible to achieve sufficient discharging capacity.

During sintering, Fe in the $LiFePO_4$ carbon composite material synthesized is in the bivalent state. So, in the temperature of the order of 600° C. as the synthesis temperature, Fe in the $LiFePO_4$ carbon composite material is promptly oxidized to $Fe^{3+}$ by oxygen in the sintering atmosphere in accordance with the chemical formula shown by the chemical formula (5):

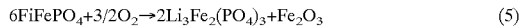

$$6FiFePO_4 + 3/2O_2 \rightarrow 2Li_3Fe_2(PO_4)_3 + Fe_2O_3 \tag{5}$$

so that impurities such as trivalent Fe compounds are produced to obstruct the single-phase synthesis of the $LiFePO_4$ carbon composite material.

So, inert gases, such as nitrogen or argon, or reducing gases, such as hydrogen or carbon monoxide, are used as the sintering atmosphere, while the oxygen concentration in the sintering atmosphere is prescribed to a range within which Fe in the $LiFePO_4$ carbon composite material is not oxidized, that is to not larger than 1012 ppm in volume. By setting the oxygen concentration in the sintering atmosphere to 1012 ppm in volume or less, it is possible to prevent Fe from being oxidized even at the synthesis temperature of 600° C. or thereabouts to achieve the single-phase synthesis of the $LiFePO_4$ carbon composite material.

If the oxygen concentration in the sintering atmosphere is 1012 ppm in volume or higher, the amount of oxygen in the sintering atmosphere is excessive, such that Fe in the $LiFePO_4$ carbon composite material is oxidized to $Fe^{3+}$ to generate impurities to obstruct the single-phase synthesis of the $LiFePO_4$ carbon composite material.

As for takeout of the sintered $LiFePO_4$ carbon composite material, the takeout temperature of the sintered $LiFePO_4$ carbon composite material, that is th temperature of the $LiFePO_4$ carbon composite material when exposed to atmosphere, is desirably 305° C. or lower. On the other hand, the takeout temperature of the sintered $LiFePO_4$ carbon composite material is more desirably 204° C. or lower. By setting the takeout temperature of the $LiFePO_4$ carbon composite material to 305° C. or lower, Fe in the sintered $LiFePO_4$ carbon composite material is oxidized by oxygen in atmosphere to prevent impurities from being produced.

If the sintered $LiFePO_4$ carbon composite material is taken out in an insufficiently cooled state, Fe in the $LiFePO_4$ carbon composite material is oxidized by oxygen in atmosphere, such that impurities tend to be produced. However, if the $LiFePO_4$ composite material is cooled to too low a temperature, the operating efficiency tends to be lowered.

Thus, by setting the takeout temperature of the sintered $LiFePO_4$ carbon composite material to 305° C. or lower, it is possible to prevent Fe in the sintered $LiFePO_4$ carbon composite material from being oxidized by oxygen in atmosphere and hence to prevent impurities from being generated to maintain the operation efficiency as well as to synthesize the $LiFePO_4$ carbon composite material having desirable characteristics as the cell with high efficiency.

Meanwhile, the cooling of the as-sintered $LiFePO_4$ carbon composite material is effected in a sintering furnace. The cooling method used may be spontaneous cooling or by forced cooling. However, if a shorter cooling time, that is a higher operating efficiency, is envisaged, forced cooling is desirable. In case the forced cooling is used, it is sufficient if a gas mixture of oxygen and inert gases, or only the inert gases, are supplied into the sintering furnace so that the oxygen concentration in the sintering furnace will be not higher than the aforementioned oxygen concentration, that is 1012 ppm in volume or less.

Although the carbon material is added prior to milling, it may be added after milling or after sintering.

However, if the carbon material is added after sintering, the reducing effect in sintering or the effect in prohibiting oxidation cannot be realized but the carbon material is used only for improving the electrical conductivity. Therefore, in case the carbon material is added after the sintering, it is necessary to prevent $Fe^{3+}$ from being left by other means.

In the carbon material is added after sintering, the product synthesized by sintering is not the $LiFePO_4$ carbon composite material but is $LiFePO_4$. So, after adding the carbon material, synthesized by sintering, milling is again carried out. By again carrying out the milling, the carbon material added is comminuted and more liable to be attached to the surface of $LiFePO_4$. By the second milling, $LiFePO_4$ and the carbon material is mixed together sufficiently so that the comminuted carbon material can be homogeneously attached to the surface of $LiFePO_4$. Thus, even when the carbon material is added after the sintering, it is possible to obtain a product similar to one obtained in case the addition of the carbon material is effected prior to milling, that is the $LiFePO_4$ carbon composite material. On the other hand, the meritorious effect similar to that described above can be realized.

The non-aqueous electrolyte secondary cell 1, employing the $LiFePO_4$ carbon composite material, obtained as described above, as the cathode active material, may, for example, be prepared as follows:

As the anode 2, the anode active material and the binder are dispersed in a solvent to prepare a slurried anode mixture. The so-produced anode mixture is evenly coated on a current collector and dried in situ to form a layer of the anode active material to produce the anode 2. As the binder of the anode mixture, any suitable known binder may be used. In addition, any desired known additive may be added to the anode mixture. It is also possible to use metal lithium, which becomes the anode active material, directly as the anode 2.

As the cathode 4, the $LiFePO_4$ carbon composite material, as the cathode active material, and the binder, are dispersed in a solvent to prepare a slurried cathode mixture. The so-produced cathode mixture is evenly coated on the current collector and dried in situ to form a layer of the cathode active material to complete the cathode 4. As the binder of the cathode active material, any suitable known binder may be used, whilst any desirable known additive may be added to the cathode mixture.

The non-aqueous electrolyte may be prepared by dissolving an electrolyte salt in a non-aqueous solvent.

The anode 2 is held in the anode can 3, the cathode is held in the cathode can 5 and the separator 6 formed by a porous polypropylene film is arranged between the anode 2 and the cathode 4. The non-aqueous electrolytic solution is injected into the anode can 3 and into the cathode can 5. The anode can 3 and the cathode can 5 are caulked together and secured with the interposition of the insulating gasket 7 in-between to complete a coin-shaped non-aqueous electrolyte cell 1.

The non-aqueous electrolyte cell 1, prepared as described above, having the $LiFePO_4$ carbon composite material as the cathode active material, has a high charging ratio of the cathode active material and is superior in electronic conductivity. Thus, with this non-aqueous electrolyte cell 1, lithium ion doping/undoping occurs satisfactorily so that the cell may be of a larger capacity. In addition, since the superior cyclic characteristics inherent in $LiFePO_4$ may be manifested sufficiently, the cell may be of a larger capacity and superior in cyclic characteristics.

There is no particular limitation to the shape of the non-aqueous electrolyte cell 1 of the above-mentioned embodiment, such that the cell may be cylindrically-shaped, square-shaped, coin-shaped or button-shaped, while it may be of a thin type or of a larger format.

EXAMPLES

The present invention is hereinafter explained based on specified test results. For checking into the meritorious effect of the present invention, the $LiFePO_4$ carbon composite material was synthesized and, using the so-produced $LiFePO_4$ carbon composite material as the cathode active material, a non-aqueous electrolyte cell was prepared to evaluate its characteristics.

Example 1

A $LiFePO_4$ carbon composite material was prepared as a cathode active material. The method for producing the cathode active material is hereinafter explained.

First, $Li_3PO_4$ and $Fe_3(PO_4)_2 \cdot 8H_2O$ were mixed to give an elementary ratio of lithium to iron equal to 1:1. To the resulting mixture were added acetylene black powders, as the amorphous carbon material, so that the acetylene black powders account for 10 wt % o the sintered product in its entirety. The mixture and the alumina balls, each 10 mm in diameter, were charged into an alumina pot 100 mm in diameter, with the weight ratio of the mixture to the alumina balls equal to 1:2. The mixture was milled using a planetary ball mill. As this planetary ball mill, a planetary rotating pot mill for test, manufactured by ITO SEISAKUSHO KK under the trade name of $LA-PO_4$, was used, and the mixture was milled under the following conditions:
Conditions for Planetary Ball Milling
radius of rotation about sun gear: 200 mm
number of revolutions about the sun gear: 250 rpm
number of revolutions about a planetary gear itself: 250 rpm
driving time duration: 10 hours.

The milled mixture was charged into a ceramic crucible and sintered for five hours at a temperature of 600° C. in an electrical furnace maintained in a nitrogen atmosphere to produce an $LiFePO_4$ carbon composite material.

This sintering was carried out as follows:

An atmospheric line provided with a gas mixer capable of mixing air and high purity nitrogen and a sintering unit having a zirconia oxygen densitometer between the atmospheric line and the sintering furnace were provided.

The pre-sintering starting materials, prepared as described above, were charged into a ceramic crucible and, as the influx amounts of air and nitrogen were adjusted so that the oxygen concentration in the sintering furnace of the electrical furnace was equal to 3 ppm in volume, the materials charged were sintered for five hours at a temperature of 600° C. to prepare a product.

Example 2

A product was prepared in the same way as in Example 1, except that the influx amounts of air and nitrogen were adjusted to give the oxygen concentration in the sintering furnace of the electrical furnace equal to 11 ppm in volume.

Example 3

A product was prepared in the same way as in Example 1, except that the influx amounts of air and nitrogen were adjusted to give the oxygen concentration in the sintering furnace of the electrical furnace equal to 67 ppm in volume.0.

Example 4

A product was prepared in the same way as in Example 1, except that the influx amounts of air and nitrogen were adjusted to give the oxygen concentration in the sintering furnace of the electrical furnace equal to 184 ppm in volume.

Example 5

A product was prepared in the same way as in Example 1, except that the influx amounts of air and nitrogen were adjusted to give the oxygen concentration in the sintering furnace of the electrical furnace equal to 290 ppm in volume.0.

Example 6

A product was prepared in the same way as in Example 1, except that the influx amounts of air and nitrogen were adjusted to give the oxygen concentration in the sintering furnace of the electrical furnace equal to 612 ppm in volume.

Example 7

A product was prepared in the same way as in Example 1, except that the influx amounts of air and nitrogen were adjusted to give the oxygen concentration in the sintering furnace of the electrical furnace equal to 867 ppm in volume.5.

Example 8

A product was prepared in the same way as in Example 1, except that the influx amounts of air and nitrogen were adjusted to give the oxygen concentration in the sintering furnace of the electrical furnace equal to 1012 ppm in volume.

Comparative Example 1

A product was prepared in the same way as in Example 1, except that the influx amounts of air and nitrogen were adjusted to give the oxygen concentration in the sintering furnace of the electrical furnace equal to 1129 ppm in volume.

Comparative Example 2

A product was prepared in the same way as in Example 1, except that the influx amounts of air and nitrogen were adjusted to give the oxygen concentration in the sintering furnace of the electrical furnace equal to 1563 ppm in volume.

X-ray diffractometry was carried out on the products obtained as described above. The results are shown in Table 1 along with the oxygen concentration in the sintering furnace. In the Table 1, the sample products matched to the powder X-ray diffraction lines stated in JCPDS-No. 401499 and in which no diffraction lines were observed are marked ○ as those sample in which single-phase synthesis of the LiFePO$_4$ carbon composite material has occurred, whereas those sample products not matched to the powder X-ray diffraction lines stated in JCPDS-No. 401499 or those sample products matched to the powder X-ray diffraction lines stated in JCPDS-No. 401499 but in which other diffraction lines were observed, are marked x.

TABLE 1

|  | oxygen concentration (ppm) | synthesizability |
|---|---|---|
| Ex. 1 | 3 | ○ |
| Ex. 2 | 11 | ○ |
| Ex. 3 | 67 | ○ |
| Ex. 4 | 184 | ○ |
| Ex. 5 | 290 | ○ |
| Ex. 6 | 612 | ○ |
| Ex. 7 | 867 | ○ |
| Ex. 8 | 1012 | ○ |
| Comp. Ex. 1 | 1129 | x |
| Comp. Ex. 2 | 1563 | x |

It is seen from Table 1 that, in the synthesis of the LiFePO$_4$ carbon composite material, the Examples 1 to 8, in which the oxygen concentration of the sintering atmosphere at the time of sintering is 1012 ppm in volume or less, are matched to the diffraction lines of the powder X rays stated in the JCPDS-No. 401499, whilst no other diffraction rays are identified, meaning that the single-phase synthesis of the LiFePO$_4$ carbon composite material has been achieved. This is presumably ascribable to the fact that, since the oxygen concentration of the sintering atmosphere is set to a preset range low enough to prohibit the oxidizing reaction of Fe, that is to 1012 ppm in volume or less, the single-phase synthesis of the LiFePO$_4$ carbon composite material has been satisfactorily achieved without producing oxidizing reactions of Fe.

It is also seen from Table 1 that, in the synthesis of the LiFePO$_4$ carbon composite material, the Comparative Examples 1 and 2, in which the oxygen concentration in the sintering atmosphere at the time of sintering is 1012 ppm in volume or higher, are not matched to the powder X-ray diffraction lines stated in JCPDS-NO. 401499 or are matched to the powder X-ray diffraction lines stated in JCPDS-No. 401499 but other diffraction lines were observed, so that, in these Comparative Examples 1 and 2, no single-phase synthesis of the LiFePO$_4$ carbon composite material has occurred. This is presumably ascribable to the fact that, since the oxygen concentration of the sintering atmosphere is too high, the Fe oxidizing reaction occurs to produce impurities to impede the single-phase synthesis of the LiFePO$_4$ carbon composite material.

It may be said from above that, by setting the oxygen concentration of the sintering atmosphere at the time of sintering to 1012 ppm in volume or less, in the synthesis of the LiFePO$_4$ carbon composite material, it is possible to prevent impurities ascribable to the oxidizing reaction of Fe from being produced even under the condition of the sintering temperature of 600° C. thus realizing the single-phase synthesis of the LiFePO$_4$ carbon composite material.

A non-aqueous electrolyte cell, employing the LiFePO$_4$ carbon composite material, produced as described above, was prepared.

Example 9

95 parts by weight of the LiFePO$_4$ carbon composite material, as the cathode active material, prepared in Example 1, and 5 parts by weight of poly (vinylidene fluoride), in the form of fluorine resin powders, as a binder, were mixed together and molded under pressure to form a pellet-shaped cathode having a diameter of 15.5 mm and a thickness of 0.1 mm.

A foil of metal lithium was then punched to substantially the same shape as the cathode to form an anode.

Then, a non-aqueous electrolyte solution was prepared by dissolving LiPF$_6$ in a solvent mixture comprised of equal volumes of propylene carbonate and dimethyl carbonate, at a concentration of 1 mol/l, to prepare a non-aqueous electrolyte solution.

The cathode, thus prepared, was charged into the cathode can, while the anode was held in the anode can and the separator was arranged between the cathode and the anode. The non-aqueous electrolytic solution is injected into the anode can and into the cathode can. The anode can and the cathode can 5 were caulked and secured together to complete a coin-shaped non-aqueous electrolyte cell 19.

Example 10

A coin-shaped test cell was prepared in the same way as in Example 9 except using the product obtained as in Example 5 as the cathode active material.

Example 11

A coin-shaped test cell was prepared in the same way as in Example 9 except using the product obtained as in Example 8 as the cathode active material.

Comparative Example 3

A coin-shaped test cell was prepared in the same way as in Example 9 except using the product obtained as in Comparative Examples 2 as the cathode active material.

The coin-shaped test cells of the Examples 9 to 11 and the Comparative Example 3, prepared as described above, the charging/discharging tests were conducted as now explained to find the initial discharging capacity and the capacity upkeep ratio after 50 cycles.

Test of Charging/discharging Cyclic Characteristics

The charging/discharging cyclic characteristics were evaluated based on the volume upkeep ratio after repeated charging/discharging.

Each test cell was charged at a constant current and, at a time point the cell voltage reached 4.2 V, the constant current charging was switched to constant voltage charging and charging was carried out as the cell voltage was kept at 4.2 V. The charging was terminated at a time point the current value fell to 0.01 mA/cm$^2$ or less. Each test was then discharged. The discharging was terminated at a time point the cell voltage fell to 2.0 V.

With the above process as one cycle, 50 cycles were carried out, and the discharging capacity at the first cycle and that at the fifth cycle were found. The ratio of the discharging capacity at the fiftieth cycle (C2) to the discharging capacity at the first cycle (C1) (C2/C1)×100 was found as the capacity upkeep ratio. Meanwhile, both the charging and the discharging were carried out at ambient temperature (25° C.), as the current density at this time was set to 0.1 mA/cm$^2$.

The results are shown in Table 2.

TABLE 2

|  | oxygen concentration on (ppm) | synthesizable or no | initial discharging capacity | capacity after 50 cycles (mAh/g) | upkeep ratio (%) |
|---|---|---|---|---|---|
| Ex.9 | 3 | o | 161 | 153 | 95 |
| Ex.10 | 290 | o | 160 | 151 | 94 |
| Ex.11 | 1012 | o | 158 | 134 | 85 |
| Comp. Ex. 3 | 1563 | x | 59 | 33 | 56 |

It may be seen from Table 2 that, in the Examples 9 to 11, employing the cathode active material in which single-phase synthesis of the $LiFePO_4$ carbon composite material was achieved, the initial discharging capacity, the discharging capacity at the fiftieth cycle (C2) and the capacity upkeep ratio were satisfactory, whereas, in the Comparative Example 3, employing the cathode active material in which reliable single-phase synthesis of the $LiFePO_4$ carbon composite material was not achieved, the initial discharging capacity, the discharging capacity at the fiftieth cycle (C2) and the capacity upkeep ratio were decreased appreciably, thus indicating that the product prepared in the Comparative Example 3 were not proper as the cathode active material.

From the foregoing, it may be said that, in order to produce an $LiFePO_4$ carbon composite material proper as a cathode active material, the oxygen concentration in the sintering atmosphere at the time of sintering needs to be not larger than 1012 ppm in volume.

Next, a polymer cell was prepared to evaluate its characteristics.

Example 12

A gelated electrode was prepared as follows: First, polyvinylidene fluoride, in which was copolymerized 6.0 wt % of hexafluoropropylene, a non-aqueous electrolyte and dimethyl carbonate, were mixed, agitated and dissolved to a sol-like electrolytic solution. To the sol-like electrolytic solution was added 0.5 wt % of vinylene carbonate VC to form a gelated electrolytic solution. As the non-aqueous electrolyte solution, such a solution obtained on mixing ethylene carbonate EC and propylene carbonate PC at a volumetric ratio of 6:4 and on dissolving $LiPF_6$ at a rate of 0.85 mol/kg in the resulting mixture was used.

A cathode was then prepared as follows: First, 95 parts by weight of the $LiFePO_4$ carbon composite material, prepared in Example 8, and 5 parts by weight of poly (vinylidene fluoride), in the form of fluorine resin powders, as a binder, were mixed together, and added to with N-methyl pyrrolidone to give a slurry, which slurry was coated on an aluminum foil 20 $\mu$m in thickness, dried in situ under heating and pressed to form a cathode coating film. A gelated electrolytic solution then was applied to one surface of the cathode coating film and dried in situ to remove the solvent. The resulting product was punched to a circle 15 mm in diameter, depending on the cell diameter, to form a cathode electrode.

The anode then was prepared as follows: First, 10 wt % of fluorine resin powders, as a binder, were mixed into graphite powders, and added to with N-methyl pyrrolidone to form a slurry, which then was coated on a copper foil, dried in situ under heating and pressed to form an anode coating foil. On one surface of the anode coating foil was applied a gelated electrolytic solution and dried in situ to remove the solvent. The resulting product was punched to a circle 16.5 mm in diameter, depending on the cell diameter, to form an anode electrode.

The cathode, thus prepared, was charged into the cathode can, while the anode was held in the anode can and the separator was arranged between the cathode and the anode. The anode can and the cathode can were caulked and secured together to complete a coin-shaped lithium polymer cell.

The polymer cell of Example 12, prepared as described above, was put to the aforementioned test on charging/discharging cyclic characteristics to find the initial discharging capacity and capacity upkeep ratio after 30 cycles. The results are shown in Table 3.

TABLE 3

|  | oxygen concentration (ppm) | initial discharging capacity (mAh/g) | volumetric upkeep ratio after 30 cycles (%) |
|---|---|---|---|
| Ex. 12 | 1012 | 156 | 95.8 |

As may be seen from Table 3, both the initial discharging capacity and capacity upkeep ratio after 30 cycles are of satisfactory values. From this, it may be seen that the cathode active material prepared in accordance with the manufacturing method of the present invention gives meritorious effects, such as improved discharge capacity and improved cyclic characteristics, even in case the gelated electrolyte is used in place of the non-aqueous electrolyte as the non-aqueous electrolytic solution.

What is claimed is:

1. A method for the preparation of a cathode active material comprising:

mixing, milling and sintering materials for synthesis of a compound represented by the general formula $Li_xFePO_4$, where $0<x\leq1$ and adding a carbon material at an optional time point in the course of said mixing, milling and sintering;

employing $Li_3PO_4$ and $Fe_3(PO_4)_2$ or its hydrate $Fe_3(PO_4)_2 \cdot nH_2O$, where n denotes the number of hydrates, as the materials for synthesis of said $Li_xFePO_4$; and setting the oxygen concentration in a sintering atmosphere to greater than or equal to 3 ppm, but less than or equal to 1012 ppm in volume at the time point of sintering.

2. A method for the preparation of a non-aqueous electrolyte cell including a cathode having a cathode active material, an anode having an anode active material and a non-aqueous electrolyte, wherein in preparing said cathode active material, sintering starting materials for synthesis of a compound represented by the general formula $Li_xFePO_4$, where $0<x\leq1$, are mixed, milled and a carbon material is added at an optional time point in the course of said mixing, milling and sintering;

$Li_3PO_4$ and $Fe_3(PO_4)_2$ or its hydrate $Fe_3(PO_4)_2 \cdot nH_2O$, where n denotes the number of hydrates, are used as the starting materials for synthesis of said $Li_xFePO_4$; and the oxygen concentration in a sintering atmosphere is set to greater than or equal to 3 ppm, but less than or equal to 1012 ppm in volume at the time point of sintering.

3. The method for the preparation of a non-aqueous electrolyte cell according to claim 2 wherein said non-aqueous electrolyte comprising a non-aqueous electrolyte includes a dissolved electrolyte in a non-aqueous solvent.

4. The method for the preparation of a non-aqueous electrolyte cell according to claim 2 wherein said non-aqueous electrolyte is a solid electrolyte.

5. The method for the preparation of a non-aqueous electrolyte cell according to claim 2 wherein said anode is a material capable of doping/undoping lithium.

6. The method for the preparation of a non-aqueous electrolyte cell according to claim 2 wherein said anode is a carbon material.

* * * * *